Figure 1:
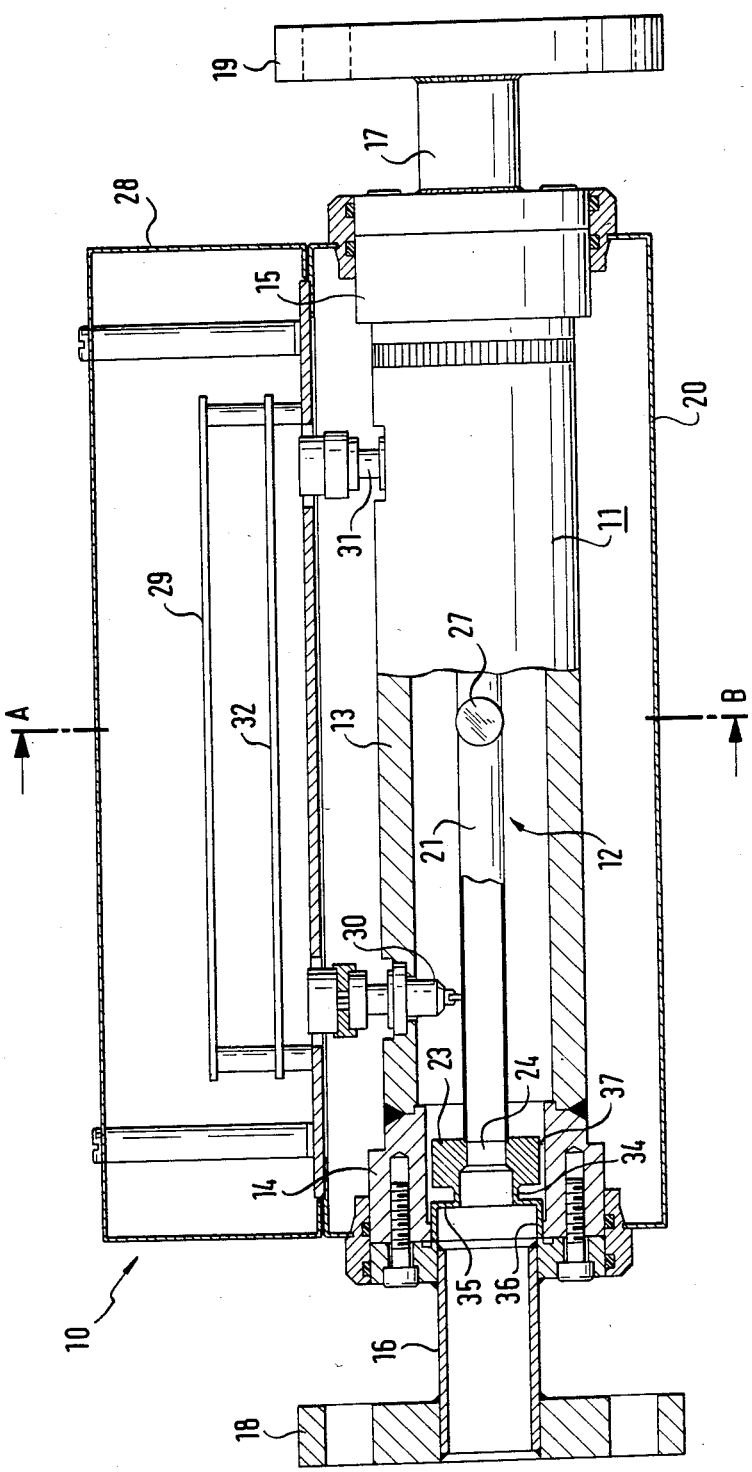

United States Patent [19]

Flecken et al.

[11] Patent Number: 4,793,191
[45] Date of Patent: Dec. 27, 1988

[54] MASS FLOW METER OPERATING BY THE CARIOLIS PRINCIPLE

[75] Inventors: Peter Flecken, Weil-Haltingen, Fed. Rep. of Germany; Niels Abildgaard, Logstor, Denmark

[73] Assignee: Flowtec AG, Switzerland

[21] Appl. No.: 99,484

[22] Filed: Sep. 22, 1987

[30] Foreign Application Priority Data

Sep. 26, 1986 [DE] Fed. Rep. of Germany ....... 3632851

[51] Int. Cl.$^4$ ............................................. G01F 1/84
[52] U.S. Cl. ................................................ 73/861.38
[58] Field of Search ............. 73/861.37, 861.38, 32 A

[56] References Cited

U.S. PATENT DOCUMENTS 3,329,019  7/1967  Sipin ................................. 73/861.38
4,329,880  5/1982  Herzl ................................ 73/861.24

FOREIGN PATENT DOCUMENTS 0119638  9/1984  European Pat. Off. .

Primary Examiner—Herbert Goldstein
Attorney, Agent, or Firm—Barnes & Thornburg

[57] ABSTRACT

A mass flow meter operating by the Coriolis principle includes a mechanical oscillating system having two straight measuring tubes which are clamped at both ends. In the center of the measuring tubes an oscillation exciter is disposed which sets the two measuring tubes into oppositely phased flexural oscillations. The mechanical oscillations are sensed by oscillation sensors which are arranged at equal distances on both sides of the oscillation exciter. The phase displacement of the sensed oscillations is a measure of the mass flow. The mechanical oscillating system is arranged axially in a support tube. For decoupling the mechanical oscillations from the support tube the mechanical oscillating system is freely suspended in the support tube at each end by an annular diaphragm. The entire mechanical oscillating system including the diaphragms preferably consists of titanium.

9 Claims, 4 Drawing Sheets

MASS FLOW METER OPERATING BY THE CARIOLIS PRINCIPLE

The invention relates to a mass flow meter operating by the Coriolis principle and comprising a support tube, a mechanical oscillating system disposed axially in the support tube and comprising at least one straight measuring tube clamped at both ends, an oscillation exciter which sets the or each measuring tube in the centre in flexural oscillations and oscillation sensors for sensing the mechanical oscillations at equal distances on both sides of the oscillation exciter.

In mass flow measuring devices of this type operating by the Coriolis principle the mass flow measurement is of course based on the fact that the measured medium flowing through the oscillating straight measuring tubes generates Coriolis forces which result in a mutual phase displacement of the mechanical oscillations at the two ends of each measuring tube. The magnitude of this phase displacement is a measure of the mass flow. The phase displacement is measured with the aid of the two oscillation sensors which convert the oscillations sensed by them to electrical sensor signals which are characteristic of the phase position of the oscillations. However, the problem is encountered that the mechanical oscillating system clamped at both ends transfers oscillation energy to the support tube and to the connected conduits. Furthermore, temperature-induced mechanical stresses arise when the measuring tubes have a temperature different to that of the support tube, as is in particular the case when measuring the mass flow of measured media whose temperature differs from the ambient temperature. Such temperature-induced stresses alter the oscillation behaviour of the mechanical oscillation system so that compensation or correction is necessary in order to avoid measurement errors.

The problem underlying the invention is to provide a mass flow meter of the type mentioned a the beginning which operates by the Coriolis principle and in which the mechanical oscillating system is mechanically well decoupled from the support tube and temperature-induced mechanical stresses are reduced.

According to the invention this problem is solved in that the mechanical oscillating system is freely suspended at each end by an annular diaphragm in the support tube.

In the mass flow meter according to the invention the mechanical oscillating system is connected to the support tube solely by the annular diaphragms disposed at the two ends. These diaphragms effect an excellent mechanical decoupling of the oscillating system from the support tube and the connected conduits. Furthermore, the diaphragms can compensate differences in the temperature-induced length changes of the support tube and mechanical oscillating system.

A further substantial improvement of a mass flow meter operating by the Coriolis principle is obtained according to the invention in that at least the or each measuring tube of the oscillating system, preferably however the entire oscillating system including the two diaphragms and any distributor members present, consist of titanium. For the following problem exists in all mass flow meters operating by the Coriolis principle and having straight oscillating measuring tubes: to enable an adequately large measuring signal to be obtained at the location of the oscillation sensors a correspondingly large oscillation amplitude must be present. The oscillation amplitude is the greater the longer the measuring tubes. On the other hand, however, the natural resonance frequency of the oscillating system is the lower the longer the measuring tubes. Since the oscillating system is stimulated to natural resonance oscillations the natural resonance frequency of the oscillating system is the operating frequency. The lower the operating frequency the greater the occurrence of uncontrollable interference oscillations which superimpose themselves on the measuring signal. Consequently, as high an operating frequency as possible of the mass flow meter would be desirable.

If the measuring tubes or preferably the entire oscillating system consist of titanium measuring signals of adequate magnitude can be obtained with substantially shorter measuring tubes than with an oscillating system made from steel. The natural resonance frequency of such an oscillating system of titanium is thus considerably higher than the natural resonance frequency of an oscillating system of steel furnishing measuring signals of the same magnitude. With the higher operating frequency of the mass flow meter having an oscillating system made from titanium undesired interference oscillations are practically eliminated. In addition, of course, a shorter overall length of the mass flow meter is also very advantageous for constructional reasons.

Advantageous further developments and embodiments of the invention are characterized in the subsidiary claims.

Figure 2:
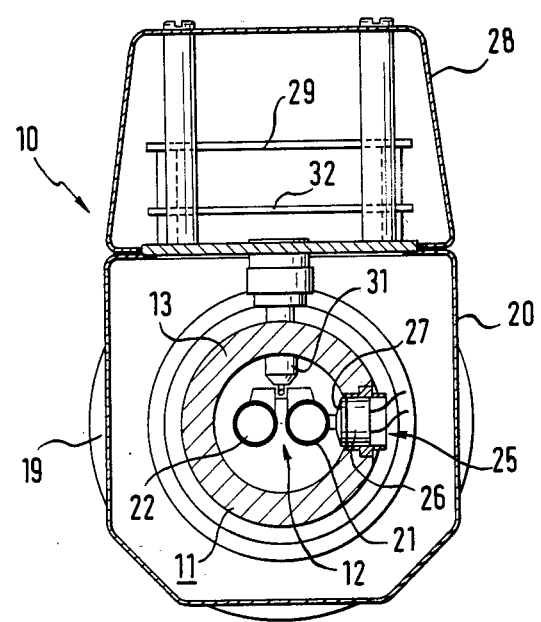
Figure 3:
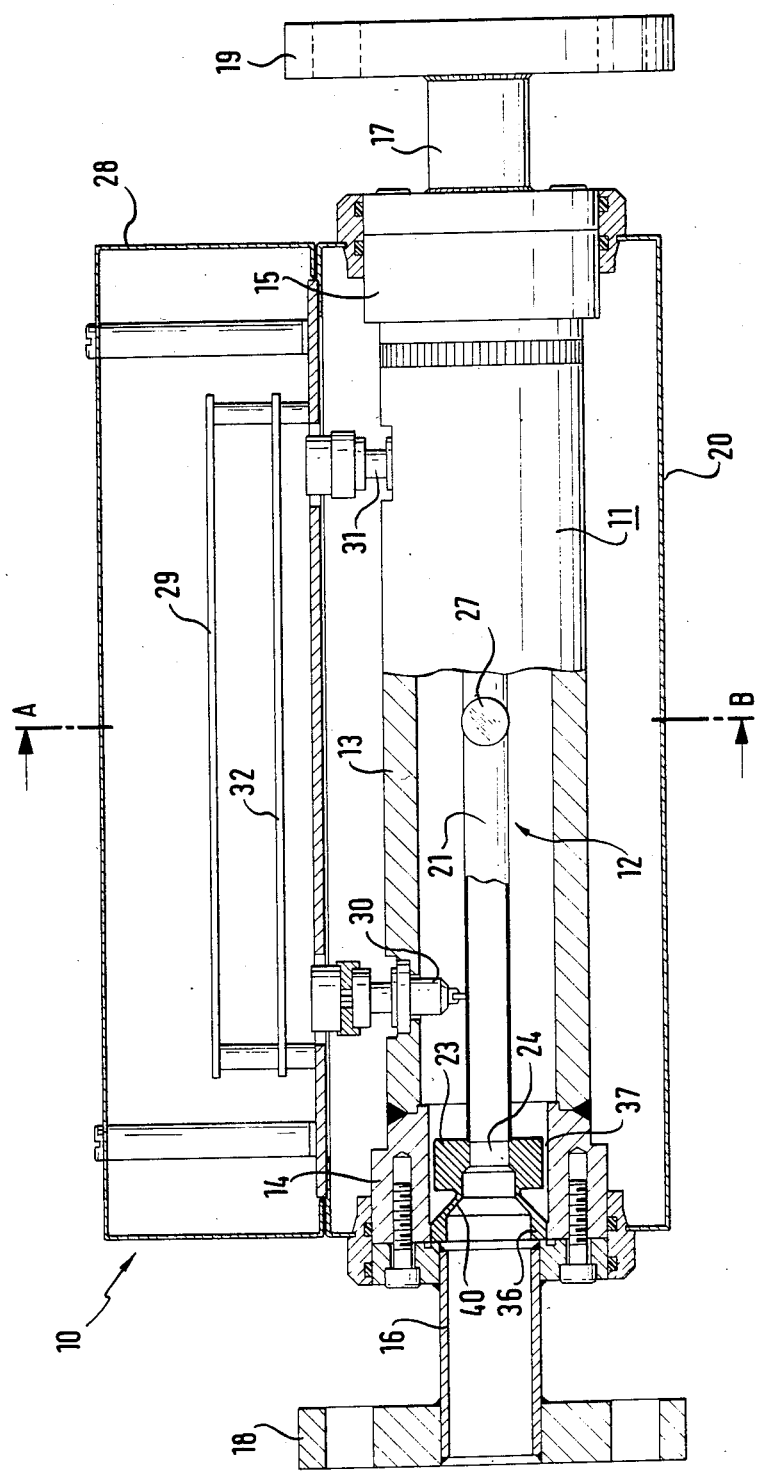
Figure 4:
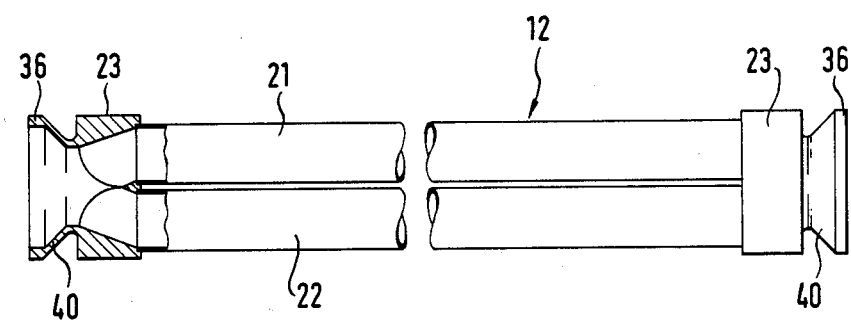

Further features and advantages of the invention will be apparent from the following description of examples of embodiment which are illustrated in the drawings, wherein:

FIG. 1 is a partially sectioned side view of a mass flow meter operating by the Coriolis principle according to a first embodiment of the invention, FIG. 2 is a cross-sectional view of the mass flow meter of FIG. 1 along the section line A-B, FIG. 3 is a partially sectioned side view of a mass flow meter operating by the Coriolis principle according to a second embodiment of the invention and FIG. 4 is a side view of the two end portions of the oscillating system of the mass flow meter of FIG. 3, one end portion being shown sectioned.

The mass flow meter 10 illustrated in FIG. 1 in a partially sectioned side view and in FIG. 2 in cross-section along the line A-B of FIG. 1 comprises a strong support tube 11 in the interior of which a mechanical oscillating system 12 is disposed. The support tube 11 consists of a tube portion 13 which is welded at each end to an end bush 14 and 15, respectively. Screwed to each end bush is a connecting piece 16 and 17 respectively carrying a flange 18 and 19 respectively. By means of the flanges 18 and 19 the mass flow meter can be inserted into a conduit through which the medium whose mass flow is to be measured flows. The support tube 11 is surrounded by a sheet metal housing 20.

The mechanical oscillating system 12 consists of two parallel measuring tubes 21 and 22 which at the two ends are connected by distributor members together in such a manner that they are connected in parallel from the fluid mechanics point of view. The measuring tubes 21 and 22 extend over the entire length of the tube portion 13 and the distributing members lie in the interior of the end bushes 14 and 15. The two distributing members are made and arranged completely identically but in the partial sectional view of FIG. 1 only the distributing member 23 lying in the interior of the end bush 14 can be seen. However, the following description of the distributing member 23 applies identically also to the distributing member arranged at the other end of the oscillating system.

The distributing member 23 is a solid circular disc of considerable thickness which contains in the interior flow passages 24 which divide the flow coming through the connecting piece 16 uniformly amongst the two measuring tubes 21 and 22. In corresponding manner the distributing member arranged at the other end combines the flow from the two measuring tubes so that the combined flow flows off through the connecting piece 17. Of course, the flow direction may also be the converse.

Arranged in the centre of the support tube 11 is an oscillation exciter 25 (FIG. 2) which can set the two measuring tubes 21, 22 into oppositely directed flexural oscillations, the oscillation plane of which lies in the common plane of the two measuring tubes, i.e. perpendicularly to the plane of the drawing in FIG. 1. The oscillation exciter 25 consists of an electromagnet which is secured in the wall of the tube portion 13 and opposite which an armature 27 lies which is secured to the measuring tube 21. When an alternating current is sent through the coil of the electromagnet 26 by the alternating attraction forces between the electromagnet 26 and the armature 27 the measuring tube 21 is set in flexural oscillations which via the distributing members 23 are coupled over to the measuring tube 22 so that finally the two measuring tubes 21 and 22 perform opposite phase flexural oscillations. The excitation alternating current comes from an electronic excitation circuit which is accommodated in a circuit housing 28 secured to the sheet metal housing 20 and which is indicated only by its printed circuit board 29. The excitation circuit is designed so that the oscillating system 12 is stimulated to oscillate at its natural resonance frequency.

The measurement of the mass flow is based in such a mass flow meter on the fact that the measured medium flowing through the oscillating measuring tubes 21 and 22 generates Coriolis forces which result in a mutual phase displacement of the mechanical oscillations at the two ends of each measuring tube. The magnitude of said phase displacement is a measure of the mass flow. For measuring the phase displacement on both sides of the oscillation exciter 25 at equal distances from the latter two oscillation sensors 30 and 31 are disposed. The oscillation sensors 30 and 31 sense the mechanical oscillations of the measuring tubes 21 and 22 and convert them to electrical sensor signals which are characteristic of the phase position of the sensed oscillations. Said sensor signals are supplied to an electronic evaluation circuit which is also accommodated in the circuit housing 28 and only indicated by its printed circuit board 32. The evaluation circuit determines the mass flow from the phase difference of the sensor signals supplied thereto.

The peculiarity of the mass flow meter illustrated resides in the suspension of the mechanical oscillating system 12 in the support tube 11. Integrally formed on the distributing member 23 is a short tubular extension 34 which is connected to the inner edge of an annular diaphragm 35. The outer edge of the diaphragm 35 is connected to a holder ring 36 which is clamped in the end bush 14 and bears axially against the somewhat inwardly projecting end face of the connecting piece 16. Thus, the oscillating system 12 is suspended axially in the support tube 11 by means of the diaphragm 35 and the corresponding diaphragm disposed at the other end. The distributing member 23 has smaller cross-section dimensions than the cavity in the interior of the end bush 14 so that round the distributing member between the peripheral surface thereof and the inner face of the end bush 14 there is an intermediate space 37. The only contact between the oscillating system 12 and the support tube 11 is thus via the diaphragms 35 attached to the two ends.

The tubular extension 34, the diaphragm 35 and the holder ring 36 may be made in one piece with the distributing member 23. The diaphragm 35 is then simply a thin wall of the material of the distributing member 23, the thickness of which is so small that the diaphragm can deform resiliently under load. Of course, the diaphragm could also be a separately made part which is sealingly connected at the outer edge in suitable manner to a separate holder ring and at the inner edge to the connecting piece, e.g. by welding. In every case this assembly is designed such that on the one hand the coupling over from the one measuring tube to the other measuring tube through the solid distributing member is as hard as possible but the coupling of the oscillating system to the outer tube by the diaphragm is as soft as possible. The diaphragm suspension of the oscillating system 12 thus gives an excellent decoupling of the mechanical flexural oscillations from the support tube 11 and the connecting pieces 16. Furthermore, different thermal expansions of the measuring tubes 21, 22 and support tube 11 are compensated by the diaphragm 35 because the latter can deform resiliently under an axial load. The axial movement of the connecting piece 23 necessary for this is possible without constraint because of the intermediate space 37.

In the embodiment illustrated in FIG. 1 the annular diaphragm 35 is planar and arranged perpendicularly to the flow direction of the measured medium This arrangement gives the optimum diaphragm effect but unfavourable flow conditions because the diaphragm 35 forms an obstruction projecting perpendicularly into the flow cross-section. This gives at the entrance side of the mass flow meter a sudden constriction and at the outlet side a sudden widening of the flow cross-section.

FIG. 3 shows a modified embodiment of the mass flow meter which differs from that of FIG. 1 only in another form of the diaphragm. All the other components are unchanged; they are therefore designated with the same reference numerals as in FIG. 1 and will not be described again. Similarly, the cross-sectional view of FIG. 2 also applies to the mass flow meter of FIG. 3.

The annular diaphragm 40 is not planar in the embodiment of FIG. 3 but conical so that it extends inclined inwardly from the holder ring 36 to the connecting piece 23. This provides at the entry side a gradual reduction of the flow cross-section and at the exit side a corresponding gradual widening of the flow cross-section, thereby substantially improving the flow conditions compared with the embodiment of FIG. 1.

Due to the conical form the diaphragm 40 in the embodiment of FIG. 3 is substantially stiffer than the planar diaphragm 35 of FIG. 1 but the relative movements between the oscillating system 12 and the support tube 11 to be compensated by the diaphragm are so small that in the case of FIG. 3 as well excellent decoupling of the oscillation movements from the support tube and conduit system is obtained.

As in the embodiment of FIG. 1, in the embodiment of FIG. 3 as well the diaphragm can be formed in one piece with the distributing member 23 and the holder ring 36 FIG. 4 shows the end portions of the oscillating system 12 of FIG. 3 with the two distributing members 23, the diaphragms 40 and the holder rings 36 in a side elevation which is seen at right angles to the sectional view of FIG. 3 so that the end portions of the two parallel straight measuring tubes 21, 22 can be seen. This illustration also clearly shows the identical configuration of the two end portions of the oscillating system.

The diaphragm suspension described for the oscillating system of a mass flow meter is not restricted to the case where the oscillating system comprises two parallel straight measuring tubes. It is also suitable for mass flow meters whose oscillating system comprises more than two parallel straight measuring tubes which are connected from the fluidic point of view in parallel by distributing members, and also for mass flow meters whose oscillating system comprises only one straight measuring tube, in which case the sole measuring tube is connected directly to the diaphragm without interposition of a distributing member.

A further substantial improvement of such mass flow meters is obtained if at least each measuring tube, preferably however the entire mechanical oscillating system including the distributing members and the diaphragms, is made from titanium. This makes it possible to eliminate a number of restrictions and disadvantages present in such mass flow meters when they have oscillating systems made from steel. In particular, when using an oscillating system of titanium measuring signals of adequate magnitude can be obtained with substantially shorter measuring tubes than when using an oscillating system of steel This gives the advantage of a higher natural resonance frequency of the oscillating system because the natural resonance frequency is the higher the shorter the measuring tubes. Since the mechanical oscillating system is stimulated to oscillate at its natural resonance frequency an oscillating system of titanium can be operated at a substantially higher frequency than an oscillating system of steel furnishing measuring signals of the same magnitude. Whereas a mass flow meter of the type illustrated in the drawings with measuring tubes of steel must be operated at a frequency lying in the order of magnitude of about 100 to 200 Hz a similar mass flow meter with measuring tubes of titanium supplying measuring signals of the same magnitude with correspondingly reduced overall length can be operated at a substantially higher frequency which is of the order of magnitude of 1000 Hz. With such a high operating frequency undesired mechanical interference oscillations are negligible. The occurrence of such interference oscillations is the greater the lower the operating frequency. They superimpose themselves on the measuring signal and falsify the measurement result.

These advantageous properties of the oscillating systems of titanium result from the fact that titanium has the optimum combination of specific weight and elasticity modulus for this purpose In addition, titanium has a favourable coefficient of thermal expansion so that a mass flow meter having an oscillating system of titanium and a support tube of steel is suitable for measurements in a large temperature range. Finally, titanium is very resistant to corrosion so that such a mass flow meter is also suitable for measurements of chemically aggressive media.

We claim:

1. Coriolis type mass flow meter comprising a support tube, a mechanical oscillation system disposed axially in the support tube and comprising at least one straight measuring tube, an oscillation exciter which sets the center of said at least one straight measuring tube in flexural oscillations, and oscillation sensors for sensing the mechanical oscillations at equal distances from the center on both sides of the oscillation exciter, and plural continuously arcuate diaphragm means each having an inner end connected to one end of the straight measuring tube and an outer end clamped to the support tube for providing the sole support for the straight measuring tube.

2. Mass flow meter according to claim 1 in which the outer end of each diaphragm means is connected to a holder ring clamped at the support tube.

3. Mass flow meter according to claim 1 in which the mechanical oscillating system comprises at least two parallel measuring tubes which at each end are connected fluidly in parallel by a distributing member and that the connection of the inner end of the diaphragm to the straight measure tube is provided by connection of the inner end of each diaphragm to the distributing member disposed at the same end of the measuring tube.

4. Mass flow meter according to claim 3 in which each diaphragm is made integrally with an associated distributing member.

5. Mass flow meter according to claim 1 in which each diaphragm has a non-wavy configuration.

6. Mass flow meter according to claim 1 in which each diaphragm is made conical.

7. Mass flow meter according to claim 1 in which each measuring tube consists of titanium.

8. Mass flow meter according to claim 7 in which the entire mechanical oscillating system including the diaphragms and the distributing members consist of titanium.

9. The flow meter of claim 7, wherein the diaphragms also consist of titanium.

* * * * *